Aug. 1, 1933.  L. Y. SPEAR ET AL  1,920,280
SUBMARINE PROPULSION
Filed Sept. 24, 1932  2 Sheets-Sheet 1
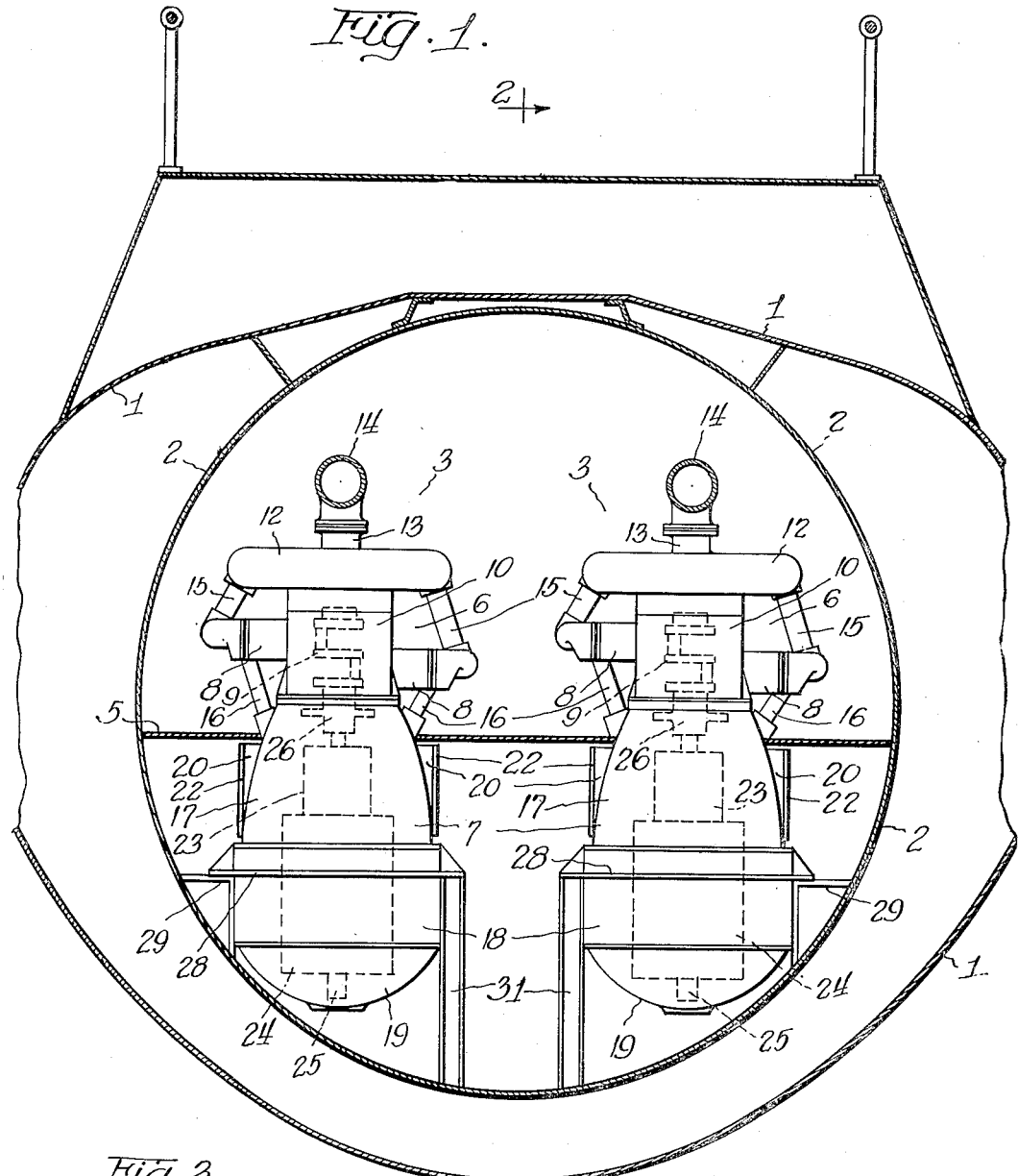
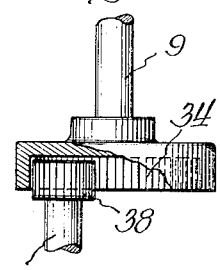
Inventors:
Lawrence Y. Spear,
Hugo E. Grieshaber,
Ernest Nibbs.

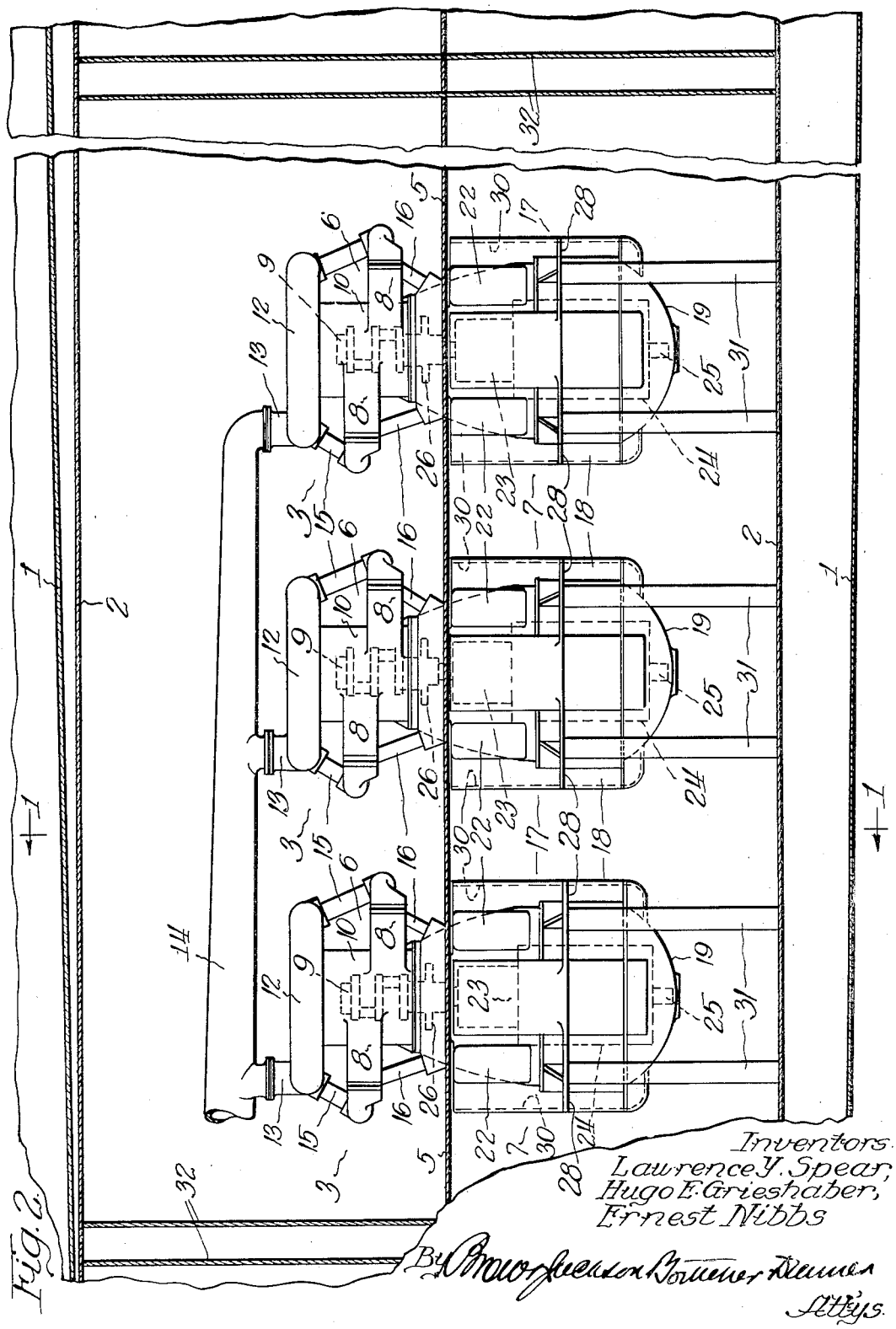

Patented Aug. 1, 1933

1,920,280

UNITED STATES PATENT OFFICE 1,920,280

SUBMARINE PROPULSION

Lawrence Y. Spear, Hugo E. Grieshaber, and Ernest Nibbs, New London, Conn., assignors to Electric Boat Company, Groton, Conn., a Corporation of New Jersey Application September 24, 1932
Serial No. 634,694

14 Claims. (Cl. 114—16.)

Our invention relates to submarine propulsion. The chief object of the invention is to provide an all-electric drive suitable for submarine propulsion.

In our copending application, Serial No. 639,120, filed October 22, 1932, we have disclosed a form of drive suitable for submarine propulsion, employing a plurality of engine-generator units disposed in an engine room to secure a compact and efficient arrangement. In the form of drive therein disclosed the engine-generator units are so constructed and disposed as to secure a compact, highly efficient power plant with effective utilization of the space allotted to the engine room. In the organization therein disclosed the units are disposed with the shafts of the engines and generators mounted in horizontal position parallel to each other.

According to the present invention a similar compact and efficient organization of the power plant is effected by disposal of the shafts of the units in a vertical position. The shafts of the engine and generator of a unit may be disposed in alignment or parallel to each other. The present organization utilizes certain of the features disclosed and claimed in said copending application, particularly the use of the same flow of air for cooling the generators and for scavenging and/or supercharging the engines or optionally employing closed cooling circuits for cooling the generators. Preferably, the same arrangement of connection and control of the units to the driving motors and/or to the battery is employed.

The present invention provides a compact but efficient disposal of the engine-generator units. It permits the generators to be driven directly or to be geared to a higher speed than the engine speed, with no substantial increase in the length of the engine room. It provides a low center of gravity and provides numerous advantages which will be apparent from the following detailed description, taken with the accompanying drawings.

Now in order to acquaint those skilled in the art with the construction and operation of a device embodying our invention, we shall describe, in connection with the accompanying drawings, a specific embodiment of the same.

Figure 1 shows a transverse vertical section through the engine room, showing two of the engine-generator units arranged abreast;

Figure 2 is a vertical longitudinal section through the engine room, showing three of the units arranged in line fore and aft to provide a total of six units; and Figure 3 is a fragmentary sectional view of a detail illustrating the gear arrangement for driving the generator shaft at higher speed than the engine shaft.

Referring first to Figure 1, the outer skin or shell 1 of the submarine encloses the inner, or pressure hull 2, suitable frames being interposed. Within the pressure hull 2, which is substantially cylindrical, a plurality of vertically disposed engine-generator units 3—3 are mounted.

A floor or deck 5 is disposed horizontally at a level slightly below the center line of the hull, although the exact location of this floor is optional.

Each engine-generator unit comprises two main parts, namely, the engine 6 and the generator 7.

Suitable transverse frames or bulkheads for supporting the floor 5 are disposed on the bottom of the hull 2, these being omitted for the sake of clearness.

Each engine unit 6 comprises a plurality of radially disposed cylinders 8, having pistons and connecting rods coupled, in pairs to the individual throws or cranks of the crank shaft 9, which has its longitudinal axis disposed vertically. The engine here shown is a multi-cylinder injection engine of the Diesel type. The radial disposal of the cylinders is not essential, but desirable in order to secure maximum accessibility with minimum axial length. The crank case 10 has suitable bearings for the ends of the crank shaft 9 to carry the radial and vertical loads thereupon. A common exhaust manifold 12, preferably in the shape of a ring, has a flanged outlet connection 13 which in turn is connected to an exhaust manifold 14. The common exhaust manifold 12 is connected to a row of engines and the manifold 14 is in turn connected to a muffler, preferably disposed in the superstructure outside the engine room.

Each cylinder 8 is connected to the manifold 12 of the particular engine by a short exhaust passageway 15. In the embodiment illustrated, the air for the intake of the engine is taken through the generator to cool the same. This, it will be understood, is optional where the cooling air for the generators is delivered to the intake of the engines. The cylinders 8—8 are connected to intake passageways comprising the short connections 16—16 leading to the generator housing. A V-type engine may be employed and in that case an intake manifold is provided, and it communicates with the top of the generator housing. It is to be understood that the air for cooling the generators may be moved through a heat exchange cooled by sea water or other means, in a closed circulatory system. Optionally, the generator may be cooled by an open circuit flow. In each case, whether open circuit or closed circuit, a blower driven by the engine is used.

The generator unit 7 comprises a housing formed of an upper housing section 17, the field ring section 18 and the end bell or bottom section 19. The lower end of the engine crank case 10 is provided with a flange which seats upon and is bolted to the top of the shell section 17. The shell section 17 has a pair of openings 20—20 on each side, these openings being closed by cover plates 22—22. Through the openings 20 the brushes for the commutator 23 may be inspected and adjusted, and likewise, access is given to the field coils which are disposed within the field ring or frame 18.

The armature 24, with its commutator 23 at the upper end of the shaft, is secured upon the shaft 24, said shaft 25 having a radial bearing in the end bell 19. The upper end of the shaft 25 is coupled to a step bearing member 26 which supports the load of the armature in a vertical direction. The same, or a separate bearing carries the radial load of the upper end of the shaft 25. Two independent bearings, namely, a step bearing on the lower face of the flange member and a cylindrical or radial bearing on the cylindrical portion below the flange, may be provided.

The crank shaft 9 is coupled to the step bearing member 26 by being splined thereto, or by any other suitable connection.

The sections 17, 18 and 19 are bolted together to form a substantially air and water tight housing for the generator. In fact, water could not enter the generator until it rose to the top of the ducts 30—30.

The field frame section 18 is provided with an extending flange 28 which rests upon suitable supporting frames such as 29 and 31, these frames extending to the inner shell 2 and serving to support the vertical load of the engines and generator units. Transverse frames bracing the units against lateral stresses are also provided, these being omitted for the sake of clearness.

Referring now to Figure 2, we have shown therein the preferred manner of introducing the cooling air for the generator 7. In this case, vertically extending ducts 30 are formed in vertically extending bosses, preferably cast or otherwise formed integral with the housing units 17, 18 and 19. Through the ducts 30 air is taken from immediately below the floor 5 and conveyed to the lower side of the field ring 18 and to the lower end of the armature 24. Natural draft, due to the heat generated in the armature and field coils by the flow of current therethrough, tends to foster an upward flow of air within the generator housing.

If desired, the space below the floor 5 and between the bulkheads 32 and 33 which define the ends of the engine room may be provided with air under a suitable pressure for forcing the air through the generators and discharging either into the open or into the engine intakes for supercharging and scavenging the engines. The ducts 30—30 are preferably provided with shutters or the like to control proportion or shut off the air to each generator. A fan disposed below the auxiliary units, taking its air from the engine room, may force air into the space below the deck and thence to the generators, or an air delivery trunk or manifold from the fan to the units may be provided. Also, we contemplate the provision of closed circuit cooling for the generators individually or in common. Each engine may drive a connected blower to move the air for cooling its coupled generator in a closed circuit through a heat exchange cooled by sea water or in an open circuit whether the air be delivered to the engine under some pressure or be discharged into the open. If closed circuit cooling is employed the heat exchange devices may be disposed within the generator casing or they may be disposed below the deck plate 5 conveniently near the corresponding unit. The engines are preferably of the injection type, such, for example, as Diesel engines, and the air which passes through the generator housing to cool the electric conductors and associated parts is, in the example illustrated, delivered through the short couplings 16—16 to the intake ports of the engine cylinders. Obviously, if desired, separate ducts may be laid in the space under the floor for supplying air from a blower or the like to the engines. Likewise, each individual generator may be provided with a separate blower if desired, so that completely independent operation of a unit may be secured.

The hollow bosses, which provide the vertically extending ducts 30—30, may be employed for the attachment of frames or bulkheads to support the engine-generator units in the hull section.

At the right of the group of units shown in Figure 2, floor space for auxiliary units and equipment is provided. If desired, the auxiliary generating units may be of the same design as herein shown or they may be of any other desired or preferred design. A portion of the space within the hull below the floor may be devoted to tankage space if desired.

While we have shown the engine and generator shafts coupled together in vertical alignment it is to be understood that gears may be introduced between the engine and generator shafts of each unit so as to operate the generator at a speed higher than that of the engine.

A suitable arrangement of gears is shown in Figure 3. An internal gear 34 is mounted upon the end of the crank shaft 9 and a pinion 35, meshing with the internal gear 34, is mounted upon the upper end of the generator shaft 25. In this case the step bearing 26 is disposed below the pinion 35. If desired, the step bearing for the armature may be disposed at the lower end of shaft 25 in either the direct coupled or the geared form. Obviously, instead of an internal gear and pinion, an external gear and pinion may be employed, but the arrangement shown in Figure 3 requires less offset between the centers of the two shafts. There is ample space to offset the generator units towards each other, leaving the engine units substantially in the position shown. If desired, the engines may be moved outwardly from the center and the generator units nearer center in order to secure the desired interposed gear without appreciable disturbance of the space arrangement herein illustrated as the preferred embodiment.

The details of engine construction and of generator construction and connections have been omitted for the sake of clearness, inasmuch as the engine may be constructed in any preferred manner consistent with the requirements above indicated. Likewise, the generator construction may be varied and the manner of connecting the units to the storage battery (not shown) and/or to each other and/or to the driving motors for the craft are omitted, since we prefer to employ the same arrangement of electrical connections disclosed in our aforesaid application.

We do not intend to be limited to the details shown or described, except insofar as they appear in the appended claims. It will be obvious to those skilled in the art that numerous changes and modifications may be made without departing from the spirit and scope of our invention.

We claim:

1. In combination, a substantially cylindrical hull section, a transverse floor, frames supporting the floor from the lower side of the hull section, a plurality of engine-generator units disposed two abreast in said hull section, said units comprising each an engine and a generator having shafts disposed vertically, the engine of each unit being disposed substantially above the floor and the generator of each unit disposed substantially below the floor, and a vertical step bearing disposed between the engine and generator for sustaining the vertical load on the generator shaft.

2. In a submarine vessel, a substantially cylindrical hull section, a transverse deck plate at approximately the level of the longitudinal axis of the hull, an engine unit having a relatively short vertical crank shaft, a crank case, and horizontally disposed cylinders supported above said deck plate, a direct current generator having a vertically disposed armature shaft driven by said crank shaft, said generator having an enclosing housing rigidly secured to the crank case of the engine, said housing being disposed substantially below said deck plates, and connections from the top of the housing to the intake passageways of the engine for delivering air from the interior of the generator housing to the engine, said generator housing having an air inlet at its lower end.

3. In a submarine vessel, a hull section, a transverse deck plate, an engine-generator unit comprising an engine having a vertically disposed crank shaft with horizontal cylinders, said cylinders having pistons connected in pairs to the crank shaft to secure a crank shaft of short length, a vertically disposed crank case, said engine being disposed above the deck plate, a generator having a vertical armature shaft arranged to be driven by the crank shaft, a closed frame and housing for the generator having its upper end rigidly coupled to the crank case, an air inlet passageway for the housing opening into the lower end of the housing, and an air outlet from the top of the housing leading to the engine intake, said generator being disposed substantially below said deck plate.

4. In a device of the class described, a substantially cylindrical hull section, a transverse deck plate disposed at approximately the longitudinal axis of the hull section, a plurality of pairs of engine-generator units disposed two abreast in rows in said hull section, each unit comprising an engine disposed above the deck plate and a connected generator disposed below the deck plate, each engine comprising a short vertical crank shaft, a vertical crank case, horizontally disposed cylinders with the pistons of said cylinders coupled in pairs to the cranks of the shaft, an exhaust manifold for a row of engines disposed above said engines of the row and conducting the exhaust gases outside the hull section, each generator having a vertical armature shaft driven by the corresponding engine crank shaft and having a housing frame rigidly coupled to the engine crank case, an air inlet connection opening into the interior of the housing at its lower end and an outlet connection at the top of the housing, and frames supporting the units and deck plate in said hull.

5. In a submarine, a hull section, a deck plate disposed at approximately the longitudinal axis of the hull section, an engine-generator unit having a vertical engine disposed substantially above said deck plate and a vertical generator disposed substantially below said deck plate, and means for conducting air through the generator to the exclusion of liquid in the bottom of the hull section.

6. In a device of the class described, a hull section, a deck plate across the middle of the hull section, an engine-generator unit having a radial engine with a vertical crank shaft disposed substantially above the deck, and a generator with a vertical armature shaft disposed substantially below the deck, said engine having a crank case and the generator having a housing rigidly coupled together and a driving connection between said shafts, said engine having pistons coupled in pairs to the cranks of the crank shaft to provide a minimum length of crank shaft.

7. In a device of the class described, a hull section, a deck plate across the middle of the hull section, an engine-generator unit having a radial engine with a vertical crank shaft disposed substantially above the deck, and a generator with a vertical armature shaft disposed substantially below the deck, said engine having a crank case and the generator having a housing rigidly coupled together and a driving connection between said shafts, said engine having pistons coupled in pairs to the cranks of the crank shaft to provide a minimum length of crank shaft, air delivery connections from the top of the housing leading to the engine cylinders, and a vertically disposed air inlet duct extending from a point below the deck to the lower end of the generator housing for admitting cooling air to the interior of the generator.

8. In combination, a vertically disposed engine generator unit comprising a radial injection engine having a ring-like exhaust manifold at its upper end and having a vertical crank shaft and crank case, and a generator having a vertical armature shaft with a closed vertical housing, said shafts being interconnected and the crank case being mounted on the generator housing, means for conducting air from the top of the housing, and means for delivering air to the lower end of the housing.

9. In combination, a vertically disposed engine generator unit comprising a radial injection engine having a ring-like exhaust manifold at its upper end and having a vertical crank shaft and crank case, and a generator having a vertical armature shaft with a closed vertical housing, said shafts being interconnected and the crank case being mounted on the generator housing, said generator housing comprising a plurality of air delivery ducts leading from the upper end of the housing to the individual cylinders, said generator housing having a plurality of vertical ducts extending down along the sides of the housing and opening into the lower end of the housing to admit air from above the lower end of the unit, said generator having a commutator disposed at the upper end of the shaft and there being normally closed inspection openings at the upper end of the housing permitting access to the commutator.

10. In a submarine vessel, a substantially cylindrical hull section, a transverse deck plate at approximately the level of the longitudinal axis of the hull, an engine unit having a relatively short vertical crank shaft, a crank case and substantially horizontal cylinders supported above said deck plate, a generator having a vertically disposed armature shaft driven by said crank shaft, said generator having an enclosed housing rigidly secured to the crank case of the engine, said housing being disposed substantially below said deck plate, and connections for passing cooling air through said housing, said connections opening into the top and bottom of said housing and being adapted to exclude any liquid which may be contained in the bottom of the hull from entering the generator housing.

11. In a submarine vessel, a substantially cylindrical hull section, a transverse deck plate at approximately the level of the longitudinal axis of the hull, an engine unit having a relatively short vertical crank shaft, a crank case and substantially horizontal cylinders supported above said deck plate, a generator having a vertically disposed armature shaft driven by said crank shaft, said generator having an enclosed housing rigidly secured to the crank case of the engine, said housing being disposed substantially below said deck plate, and means for passing cooling air through said generator housing, said means excluding from the housing any liquid which may be contained in the bottom of the hull.

12. In a device of the class described, a hull section, a deck plate across the middle of the hull section, an engine-generator unit having a radial engine with a vertical crank shaft disposed substantially above the deck, and a generator with a vertical armature shaft disposed substantially below the deck, said engine having a crank case and the generator having a housing rigidly coupled together and a driving connection between said shafts, said engine having pistons coupled in pairs to the cranks of the crank shaft to provide a minimum length of crank shaft, and a vertically disposed air inlet duct extending from a point below the deck to the lower end of the generator housing for admitting cooling air to the interior of the generator.

13. In combination, a vertically disposed engine generator unit comprising a radial injection engine haivng a ring-like exhaust manifold at its upper end and having a vertical crank shaft and crank case, and a generator having a vertical armature shaft with a closed vertical housing, said shafts being interconnected and the crank case being mounted on the generator housing, said generator housing having a plurality of vertical ducts extending down along the sides of the housing and opening into the lower end of the housing to admit air from above the lower end of the unit, said generator having a commutator disposed at the upper end of the shaft and there being normally closed inspection openings at the upper end of the housing permitting access to the commutator.

14. In a device of the class described, a substantially cylindrical hull section a horizontal deck plate across the hull section, an engine having a vertical crank shaft and a crank case disposed above the deck plate, a generator having a housing secured to the crank case, a vertical armature shaft having a driving connection with the crank shaft, an armature on said armature shaft, said armature having a commutator at its upper end, the housing having inspection openings at its upper end adjacent said commutator, said openings having releasable covers and a vertically disposed air inlet duct integral with the housing and opening into the lower end of the housing.

LAWRENCE Y. SPEAR.
HUGO E. GRIESHABER.
ERNEST NIBBS.